United States Patent
Andrews et al.

(10) Patent No.: US 7,995,498 B2
(45) Date of Patent: Aug. 9, 2011

(54) METHOD AND SYSTEM FOR PROVIDING CONFIGURATION OF NETWORK ELEMENTS THROUGH HIERARCHICAL INHERITANCE

(75) Inventors: Robert Andrews, Morgan Hill, CA (US); Navindra Yadav, San Jose, CA (US); Shree Murthy, San Jose, CA (US); Gnanaprakasam Pandian, Cupertino, CA (US); Murali Duvvury, Santa Clara, CA (US); Sudhakar Padavala, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 618 days.

(21) Appl. No.: 11/353,311

(22) Filed: Feb. 13, 2006

(65) Prior Publication Data

US 2007/0189288 A1    Aug. 16, 2007

(51) Int. Cl.
*H04L 12/28* (2006.01)

(52) U.S. Cl. ........ 370/254; 370/340; 370/408; 709/220; 709/226

(58) Field of Classification Search .......... 709/220–226; 370/254, 340, 408
See application file for complete search history.

(56) References Cited

U.S. PATENT DOCUMENTS

| | | | | |
|---|---|---|---|---|
| 5,751,967 A * | 5/1998 | Raab et al. | ............ | 709/228 |
| 5,764,911 A * | 6/1998 | Tezuka et al. | ............ | 709/223 |
| 5,774,689 A * | 6/1998 | Curtis et al. | ............ | 703/21 |
| 5,831,975 A * | 11/1998 | Chen et al. | ............ | 370/256 |
| 6,041,347 A * | 3/2000 | Harsham et al. | ............ | 709/220 |
| 6,047,320 A * | 4/2000 | Tezuka et al. | ............ | 709/223 |
| 6,289,377 B1 * | 9/2001 | Lalwaney et al. | ............ | 709/222 |
| 6,304,917 B1 * | 10/2001 | Douceur et al. | ............ | 719/310 |
| 6,308,282 B1 * | 10/2001 | Huang et al. | ............ | 714/4 |
| 6,470,022 B1 * | 10/2002 | Rochberger | ............ | 370/437 |
| 6,571,286 B2 * | 5/2003 | Fisher et al. | ............ | 709/224 |
| 6,573,907 B1 * | 6/2003 | Madrane | ............ | 715/719 |
| 6,690,653 B1 * | 2/2004 | Anbiah et al. | ............ | 370/256 |
| 6,697,924 B2 * | 2/2004 | Swank | ............ | 711/163 |
| 6,735,626 B1 * | 5/2004 | Tezuka et al. | ............ | 709/223 |
| 6,795,846 B1 * | 9/2004 | Merriam | ............ | 709/203 |
| 6,804,710 B1 * | 10/2004 | Kawada et al. | ............ | 709/221 |
| 6,880,000 B1 * | 4/2005 | Tominaga et al. | ............ | 709/220 |
| 6,973,622 B1 * | 12/2005 | Rappaport et al. | ............ | 715/735 |
| 7,092,715 B2 * | 8/2006 | Korpela et al. | ............ | 455/446 |
| 7,143,153 B1 * | 11/2006 | Black et al. | ............ | 709/223 |
| 7,174,371 B2 * | 2/2007 | Elo et al. | ............ | 709/220 |
| 7,216,166 B2 * | 5/2007 | Sugauchi et al. | ............ | 709/224 |
| 7,225,244 B2 * | 5/2007 | Reynolds et al. | ............ | 709/223 |
| 7,388,831 B2 * | 6/2008 | Basturk | ............ | 370/230 |
| 7,583,685 B2 * | 9/2009 | Ajitomi et al. | ............ | 370/401 |
| 2002/0165961 A1 * | 11/2002 | Everdell et al. | ............ | 709/225 |
| 2003/0212767 A1 * | 11/2003 | Yang-Huffman | ............ | 709/220 |
| 2003/0235158 A1 * | 12/2003 | Lee et al. | ............ | 370/256 |
| 2004/0059811 A1 * | 3/2004 | Sugauchi et al. | ............ | 709/224 |
| 2004/0073600 A1 * | 4/2004 | Elo et al. | ............ | 709/201 |
| 2004/0073659 A1 * | 4/2004 | Rajsic et al. | ............ | 709/224 |
| 2004/0120488 A1 * | 6/2004 | Dempsey et al. | ............ | 379/114.14 |
| 2004/0136394 A1 * | 7/2004 | Onno et al. | ............ | 370/438 |

(Continued)

*Primary Examiner* — Aung S Moe
*Assistant Examiner* — Benjamin Elliott
(74) *Attorney, Agent, or Firm* — Cesari and McKenna, LLP; Michael R. Reinemann (57) ABSTRACT

A method and system provides dynamic configuration of network elements using hierarchical inheritance. The method includes monitoring a data network, detecting a change associated with a configuration of the data network, identifying one or more member groups affected by the detected change, and modifying the network configuration for the one or more member groups in the data network.

15 Claims, 5 Drawing Sheets

U.S. PATENT DOCUMENTS

| | | | |
|---|---|---|---|
| 2004/0202120 A1* | 10/2004 | Hanson | 370/328 |
| 2004/0210877 A1* | 10/2004 | Sluiman et al. | 717/130 |
| 2005/0182831 A1* | 8/2005 | Uchida et al. | 709/220 |
| 2006/0072554 A1* | 4/2006 | Farahmand et al. | 370/352 |
| 2006/0133264 A1* | 6/2006 | Yamauchi | 370/216 |
| 2006/0212568 A1* | 9/2006 | Morris et al. | 709/224 |
| 2006/0253566 A1* | 11/2006 | Stassinopoulos et al. | 709/224 |
| 2006/0256736 A1* | 11/2006 | Koehler et al. | 370/254 |
| 2006/0274774 A1* | 12/2006 | Srinivasan et al. | 370/420 |
| 2007/0050409 A1* | 3/2007 | Bugir et al. | 707/104.1 |
| 2007/0121527 A1* | 5/2007 | Zhou et al. | 370/254 |
| 2007/0189288 A1* | 8/2007 | Andrews et al. | 370/390 |
| 2008/0056156 A1* | 3/2008 | Andrews et al. | 370/254 |

* cited by examiner

METHOD AND SYSTEM FOR PROVIDING CONFIGURATION OF NETWORK ELEMENTS THROUGH HIERARCHICAL INHERITANCE

FIELD OF THE INVENTION

The present invention relates to data network management. More specifically, the present invention relates to dynamically monitoring and configuring network elements through hierarchical inheritance based on logical groups in the data network.

BACKGROUND

With the continuing increase in the number of switches and routers in an administrative domain of a data network, it is increasingly difficult to configure and maintain the switches and routers that manage the data network. The network administrator must take into account not only how the network is designed, and its configuration, but also, how the network devices that support the network interact with each other.

Existing approaches for setting up of span sessions in the network are generally limited in functionality as they are implemented as add-ons to the network. For example, one approach includes the examination of the configuration files on network devices, and by snooping packets. A limitation of this approach is that the configuration files on the network devices are not a substitute for the know-how of the administrator that initially configured the network. While the configuration files in the network devices provide the properties of the network configuration, they do not typically provide the reasons behind the properties for the configuration in the network. Thus, any reconfiguration of the network without fully comprehending the reasons behind the properties for the configuration of the network devices may not yield the optimum configuration.

Furthermore, with respect to the challenge of the network configuration changes over time, network add-ons may not be configured to be fully integrated into every network device in the network, and thus, cannot reliably track the users and hosts as they migrate within the network, changing the network topology. Moreover, existing approaches cannot track users or groups of users because of their dynamic nature— that is, users can migrate from machine to machine within the network, while hosts can migrate from port to port.

In view of the foregoing, it would be desirable to have methods and systems for dynamically monitoring data network and managing the network elements based on high level intents associated with the network elements organized in logical groups in the data network.

SUMMARY OF THE INVENTION

In view of the foregoing, in accordance with the various embodiments of the present invention, there is provided method and system for dynamically monitoring network data traffic and configuring the network elements by, for example, applying individual attributes of a network device to groups of network elements in a data network, and further, the attributes of the group may be further applied to appropriate ports in the network, rather than port settings being applied directly to ports. More specifically, in certain embodiments of the present invention, network elements are arranged in a logical group hierarchy such that the effective set of attributes of each logical group in the network includes the attributes that are appropriately applied to the logical group. Furthermore, the logical group membership is also dynamically monitored so as to determine the current and network elements that are associated with each logical group in the data network.

These and other features and advantages of the present invention will be understood upon consideration of the following detailed description of the invention and the accompanying drawings.

DETAILED DESCRIPTION

Figure 1:
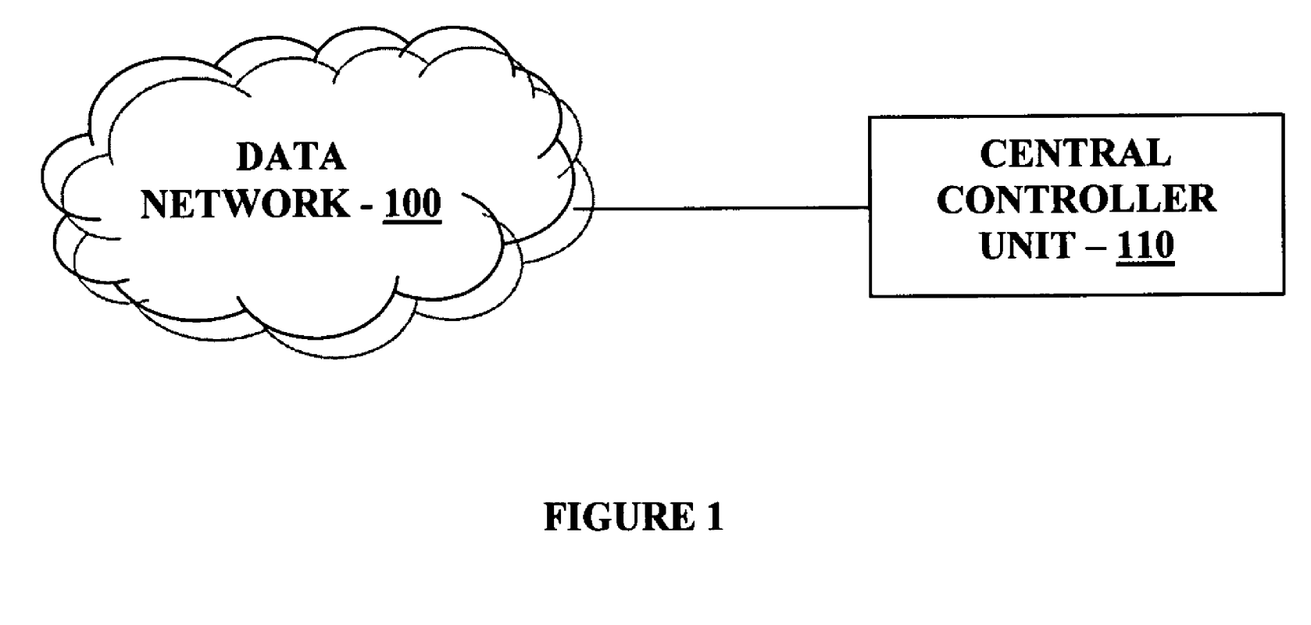
FIG. 1 is a block diagram of an overall data network for practicing one or more embodiments of the present invention.

FIG. 1 is a block diagram of an overall data network coupled to a central controller for practicing one or more embodiments of the present invention. Referring to FIG. 1 as can be seen, there is provided a central controller unit 110 coupled to a data network 100. In one embodiment, the data network 100 may include one or more local area networks (LANs) and/or a wide area network (WAN) that is operatively coupled to and is subject to the configuration control by the central controller unit 110. In one embodiment, the central controller unit 110 may be configured to be in complete control of the network devices within the data network 100— that is, the network devices which support the network 100. For example, the central controller unit 110 in one embodiment may be responsible for the configuration of VLAN trunking protocol (VTP) which is the mechanism used to specify overlays of each logical network (VLAN) over the physical network in the data network 100.

Figure 2:
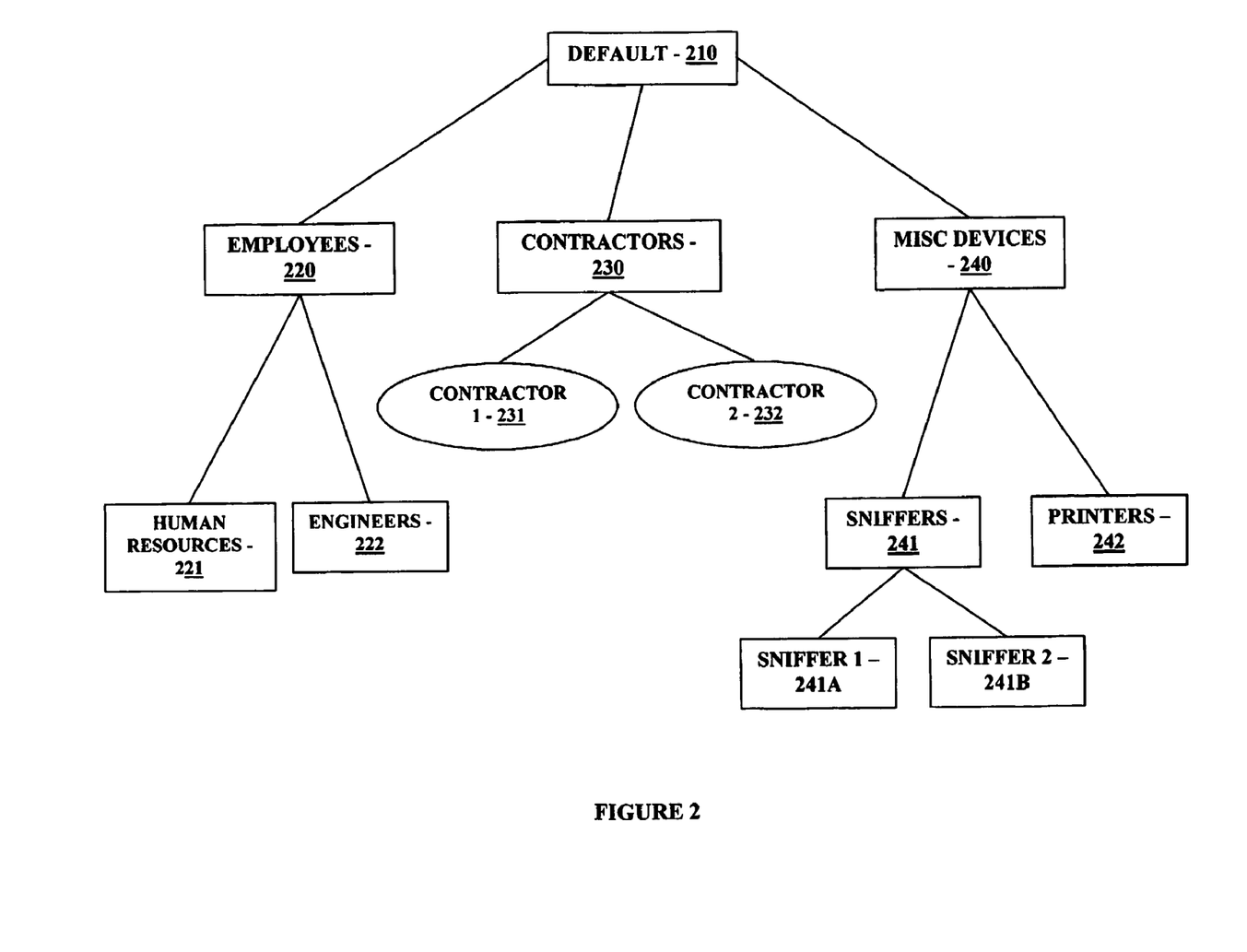
FIG. 2 is a block diagram illustrating a logical group hierarchy in the data network 100 of FIG. 1 in one embodiment of the present invention.

FIG. 2 is a block diagram illustrating a logical group hierarchy in the data network 100 of FIG. 1 in one embodiment of the present invention. Referring to the Figure, under the default group 210, there are provided three logical groups including employees group 220, contractors group 230 and miscellaneous devices 240. Moreover, each of the aforementioned group in turn includes additional members. For example, the human resources 221 and the engineers 222 are members of the employees group 220, while contractor 1 231 and contractor 2 232 are members of the contractors group 230. Additionally, it can be seen from FIG. 2 that sniffers 241 and printers 242 are members of the miscellaneous devices 240 group. In addition, it can be further seen that sniffers 241 also includes several members including sniffer 1 241A, and sniffer 2 241B.

In this manner, in one embodiment of the present invention, each network device, user or host are mapped in a hierarchy and in logical groups based on the network level configuration (high level intents). Referring to the Figures, as shown, in one embodiment of the present invention, the central controller unit 110 may be configured to monitor the traffic of all contractors 230 in the network 100. In this manner, in addition to the location and identification of the user or host being monitored by the central controller unit 110, and the location and identification of the network device which is configured to receive the monitored traffic as in the embodiments described above, the central controller unit 110 is configured to determine the hierarchy of users and devices in the network 100 in, for example, logical groups, where the administrator of the network 100 is configured to classify and categorize the users and other network clients in the aforementioned hierarchy.

In one embodiment, the central controller unit 110 monitoring the traffic in the network 100 may be configured to apply the one or more attributes of the user or host in the network 100 to the appropriate groups in the hierarchy such that changes in the network topology is continuously monitored by the central controller unit 110 and dynamically configured to apply the appropriate network attributes associated with the changes in the network topology on a group basis in the group hierarchy.

More specifically, the logical groups are similar to physical groups in that they contain attributes, are hierarchical and can inherit attributes from multiple parent groups, for example. However, logical groups differ from physical groups in that the attributes contained within the logical groups are distinct from the attributes that can be contained with physical groups. In other words, the physical and local groups are completely independent and exist in a different name-space in the network 100.

Both physical groups and logical groups have attributes which are applied to ports, or to systems that are connected through ports, when the port becomes a member of the group. However, physical groups contain attributes that affect all communications in and out of a port such as for example, speed, duplex, storm-control settings. Moreover, physical group attributes also provide the rules by which the logical groups for users connected through the ports are selected. On the other hand, the attributes of logical groups do not necessarily affect all communications in and out of a port to one or more networks or systems. Examples of logical group attributes include, for example, VLAN and Access Control Entries (ACEs) and network monitoring parameters. Indeed, since the attributes that the logical groups have do not physically affect the port, and thus do not affect all communications that pass through the port, a port may be a member of more than one logical group at a time. By contrast, ports are member of exactly one physical group, as the attributes of the physical group affect all communications that pass through the ports.

Logical group membership on a port is the mechanism by which port settings that pertain to an attached network client are dynamically applied to the port under consideration. In one aspect, logical group membership may be defined by port, MAC address, by authentication, or by voice-VLAN. That is, rules for specification of logical group membership on ports is achieved by specifying a logical group membership rules in the physical group which the port is a member of (or in a physical group whose properties are inherited by the physical group which the port is a member of).

For example, to define a logical group membership by port, a parameter may be set on a port such as an interface, by setting a property in a physical group that specifies that any system connected to the network through a port with that property is a member of a specified logical group. A logical group membership definition by MAC address may include a property that may be set in a physical group which specifies that the system with a specific MAC address is a member of a specified logical group if the system is detected on a port which is a member of the physical group with the property, or a member of a physical group which is inheriting the property. The mapping between MAC addresses and logical groups is stored as static physical group configuration data in the central controller unit 110.

In the case of defining a logical group membership based on authenticated user, an property may be set in a physical group which specifies that the system that authenticates in a specified manner (e.g., using an opaque string obtained from the authentication service at the time that a network device is connected to a port and engages in IEEE 802.1x authentication), is a member of the specified logical group. Further, in the case of defining the logical group membership by voice-VLAN, a property in a physical group may be set which specifies that any client that communicates with the switch that request a voice VLAN is instructed to use the VLAN configured for the logical group—and the client is then automatically authenticated with the specified logical group.

Referring back to FIG. 2, in one embodiment, the central controller unit 110 may be configured to monitor all network traffic sent to or from any contractor (for example, contractor 1 231 or contractor 2 232) over the network 100. In addition, the central controller unit 110 is configured to determine the destination of the monitored traffic—for example, sniffer 1 241 A. In this manner, the source for monitored traffic is no longer a specific user of the network 100, but rather, it includes a logical group —the contractors 230 logical group. Accordingly, any user or group which inherits attributes from the contractors 230 logical group is configured to be monitored as soon as the network administrator specifies that the contractors 230 logical group is to be monitored. It is to be noted that the users and groups that inherit attributes from the contractors 230 logical group may change.

The central controller unit 110 accordingly may be configured to monitor not only where the contractor 1 231 and contractor 2 232 are in the network 100, but also, to monitor the dynamic set of users and groups that are considered or included in the contractors 230 logical group (which may vary dynamically with addition and/or deletion). Thus, the central controller unit 110 in one embodiment may be configured to arrange for new and existing users classified in the logical group for contractors 230 to be monitored. The central controller unit 110 in one embodiment is also configured to cease monitoring of traffic of users or hosts that were in the logical group of contractors 230, but that have left the network 100, or users that remain connected to the network 100 are no longer classified as part of the contractors 230 logical group.

In the example described above, the destination for the monitored traffic is not a logical group with a dynamic set of members, but rather, is a specified device in the network 100 such as a single network monitoring device, or sniffer 241A. In addition, within the scope of the present invention, the central controller unit 110 may be configured to monitor both the source and the destinations of the monitored traffic that are logical groups, and thus taking into account the dynamic logical group membership of destinations for the monitored traffic group, and further configured to modify the actual network configuration as the destinations for the monitored traffic dynamically changes.

Figure 3:
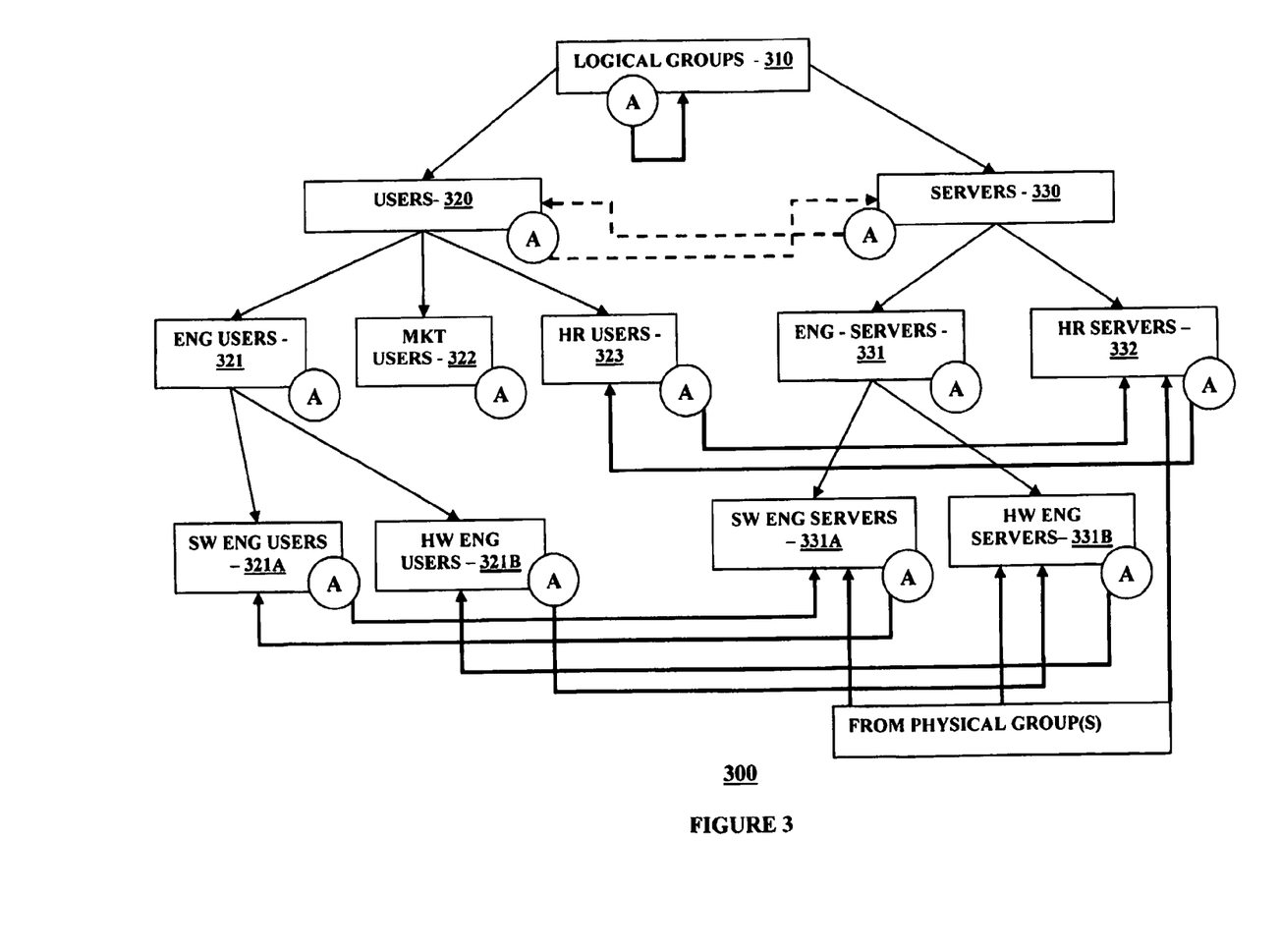
FIG. 3 is a block diagram illustrating the logical group hierarchy database configuration associated with the central controller unit 110 in one embodiment of the present invention.

FIG. 3 is a block diagram illustrating the logical group hierarchy database configuration associated with the central controller unit 110 in one embodiment of the present invention. Referring to FIG. 3, database 300 associated with the central controller unit 110 (FIG. 1) may be configured in one embodiment to store the hierarchical logical groups 310 as shown. More specifically, referring to FIG. 3, attributes "A" associated with the logical groups 310 are provided as reference links associated with a permit Access Control Entries (ACEs) as shown by the solid arrow indication. Referring to FIG. 3, at a lower level in the hierarchy of logical groups, there is provided users logical group 320 and servers logical group 330, each associated with the corresponding attributes "A".

The dotted arrow from the attributes "A" of the users logical group 320 to the servers logical group 330, and the dotted arrow from the attributes "A" of the servers logical group 330 to the users logical group 320 indicate reference links associated with a deny Access Control Entries (ACEs). That is, in the configuration shown in FIG. 3, the central controller unit 110 (FIG. 1) is configured in one embodiment so that the users logical group 320 and the servers logical group 330 are not configured to communicate with each other directly. In one embodiment of the present invention, the ACEs at a lower level in the logical group hierarchy are configured to take precedence over ACEs located higher in the hierarchy for members of logical groups which are inheriting the ACEs from logical groups located above in the hierarchy and in two different levels within the hierarchy.

More specifically, in one embodiment of the present invention, not all of the members of the users logical group 320 may be configured to communicate with the members of the servers logical group 330. That is, referring back to FIG. 3, the engineering users member (Eng Users) 321 and the marketing users member (Mkt Users) 322 are not configured to communicate with the members (e.g., engineering servers (Eng Servers) 331) and human resources member (HR servers) 332) of the servers logical group 330. Referring to FIG. 3, this is shown by the absence of an arrow from the respective attribute "A" of the users logical group 320 members, to a corresponding member of the servers logical group 330.

On the other hand, it can be seen from FIG. 3 that the human resources member (HR Users) 323 in the users logical group 320 has an arrow from its attributes "A" to the human resources member (HR Servers) 332 of the servers logical group 330, while the human resources member (HR servers) 332 of the servers logical group 330 has an arrow from its attributes "A" to the human resources member (HR Users) 323 in the users logical group 320. In this case, the attributes "A" of the HR Users 323 member of the users logical group 320 are associated with reference links to the a permit ACEs to the HR servers member 332 of the servers logical group 330. Accordingly, the central controller unit 110 (FIG. 1) is configured to associate high level intents of the HR users member 323 in the users logical group 320 to the HR servers member 332 in the servers logical group 330 and vice versa, such that any change that affects the network topology or configuration associated with the HR users member 323 of the users logical group 320 are dynamically reflected in the HR servers member 332 of the servers logical group 330. Likewise, changes that affect the network topology or configuration associated with the HR servers member 332 of the servers logical group 330 are dynamically reflected in the HR users member 323 of the users logical group 320.

Referring back to FIG. 3, at the next level in the logical group hierarchy, the members of the engineering users logical group 321 are respectively associated with a corresponding member of the engineering servers logical group 331. In other words, as shown in FIG. 3 by the solid arrows originating from the attributes "A" of a users logical group member (software engineering users member 321A, and hardware engineering users member 321B) to a respective member (e.g., software engineering servers member 331A, and hardware engineering servers member 331B) of the engineering servers logical group 331, the appropriate reference links are associated with a permit ACE. Moreover, the respective attributes "A" of the members of the engineering servers logical group 331 (software engineering servers member 331A, and hardware engineering servers member 331B) are provided with solid arrows as shown in FIG. 3 to the respective member of the engineering users logical group 321 (i.e., software engineering users member 321A, and hardware engineering users member 321B), indicating respective reference links associated with permit ACEs.

In the manner described above, in one embodiment of the present invention, the central controller unit 110 (FIG. 1) is configured to dynamically manage the data flow in the data network 100 such that, for example, with reference to FIG. 3, members of certain logical groups are configured to communicate with the members of a corresponding other logical groups within the hierarchical structure of the logical group structure of the network 100 such that the central controller unit 110 may be configured to dynamically configure the member devices within a given logical group with the high level intents associated with the changes in the network attributable to the given logical group.

Figure 4:
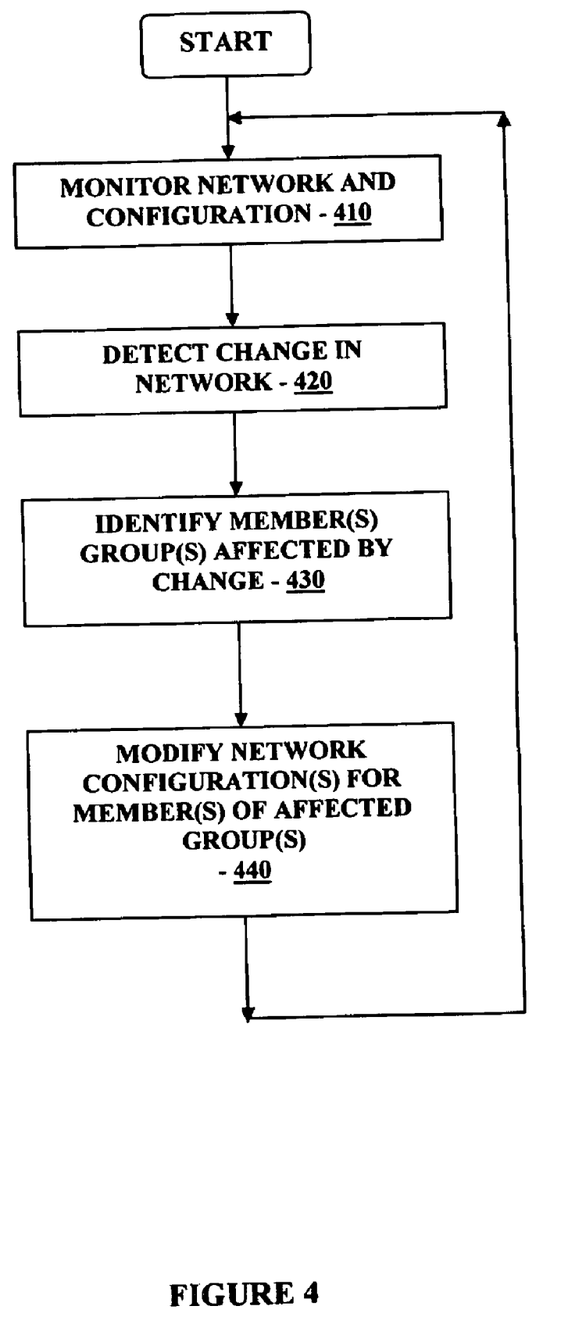
FIG. 4 is a flowchart illustrating the network configuration through hierarchical inheritance in accordance with one embodiment of the present invention.

FIG. 4 is a flowchart illustrating the network configuration through hierarchical inheritance in accordance with one embodiment of the present invention. Referring to FIG. 4, at step 410, in one embodiment, the central controller unit 110 (FIG. 1) is configured to monitor the data network 100 (FIG. 1) and the network configuration, and at step 420 when a change in the network is detected, the central controller unit 110 is configured to identify the member(s) groups that are affected by the detected change in the network 100, and the corresponding high level intent related to the detected change such as the associated network level configuration. Thereafter, at step 440, the central controller unit 110 is configured to modify the network configuration(s) for the member(s) of the affected groups that were identified in step 430. For example, in one embodiment, the central controller unit 110 is configured to apply the identified or ascertained high level intent or the network level configuration associated with the detected change in the network 100, to the identified member groups in the hierarchy that are affected by the detected change, thus dynamically modifying the network configuration based on the detected network change. It should be noted that the step of modifying the network configuration of step 440 is described in further detail below in conjunction with FIG. 5.

Referring back to FIG. 4, after the central controller unit 110 (FIG. 1) modifies the network configuration(s) for members of affected groups, the central controller unit 110 is configured to return to step 410 to monitor the network and the configuration, and the steps described above are repeated such that, in one embodiment, the central controller unit 110 is configured to monitor the data network 100 and the network configuration on a real time on-going basis.

Figure 5:
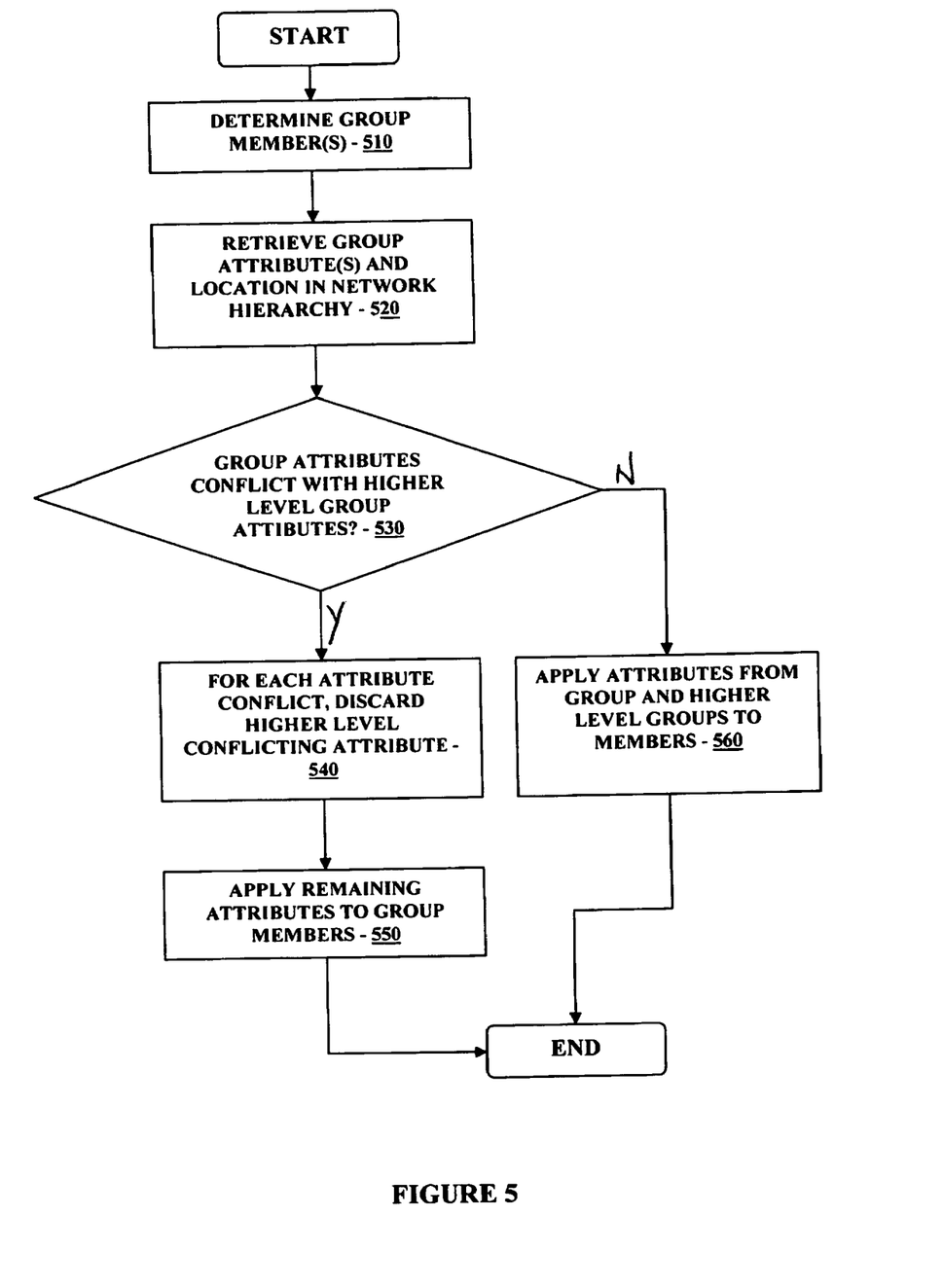
FIG. 5 is a flowchart illustrating the step of modifying the network configuration(s) for the logical group associated with the detected change of step 440 in one embodiment of the present invention.

FIG. 5 is a flowchart illustrating the step of modifying the network configuration(s) for the logical group associated with the detected change of step 440 in one embodiment of the present invention. Referring to FIG. 5, at step 510, the logical group members associated with the detected change in the network 100 are determined. Thereafter, at step 520, the central controller unit 110 is configured to retrieve the logical group attribute(s) and the location of the members in the logical group hierarchy in the data network 100. Then at step 530, the central controller unit 110 compares the retrieved group attributes with the group attributes at the higher level in the logical group hierarchy to determine the appropriate set of group attributes for the group members.

Referring to FIG. 5, if it is determined at step 530 that the retrieved logical group attributes associated with the identified members of the logical group conflict with the higher level group attributes, then at step 540, for each attribute conflict, the central controller unit 110 is configured to discard the higher level conflicting attribute, and thereafter, at step 550, configured to apply the remaining attributes to the identified members of the logical group.

In this manner, in case a conflict arises in the network level configuration, the lower level attributes or configuration in the hierarchy is configured to supercede the higher level attribute in the hierarchy. For example, referring back to FIG. 2, in the case where the attribute for contractor 1 231 is modified and the central controller unit 110 determines that the modified attribute for the contractor 1 231 conflicts with the network level configuration (or the high level intent) of the contractors group 230, the central controller unit 110 is configured to replace the conflicting attributes of the network level configuration setting of the logical group contractors 230 with the corresponding modified attributes of contractor 1 231 for contractor 1 231 based on the network change.

Referring again to FIG. 5, if at step 530 it is determined that no conflict exists, then at step 560, the central controller unit 110 is configured to apply the group attributes and attributes of higher level groups to the group members. That is, the attribute(s) of the network level configuration setting which are at a higher level in the logical group hierarchy than the group members, as well as the attributes of the group members are applied to the group members. For example, referring back to FIG. 2, if no conflict exists in the modified attribute to the contractor 1 231, then the central controller unit 110 is configured to apply the modified attribute of the contractor 1 231 as well as the attributes of the network level configuration setting of the higher level contractors group 230 to the contractor 1 231.

In the manner described above, in accordance with one aspect of the present invention, individual attributes of a network device may be applied to groups in a network, and further, the attributes of the group are further applied to appropriate ports in the network, rather than port settings being applied directly to ports. The logical groups in the network are arranged hierarchically such that the effective set of attributes of each logical group in the network includes the attributes that are applied to the logical group, and further, that of any group above the particular logical group in the hierarchy. Furthermore, as discussed above, in cases where there is a conflict when the attributes are applied (or inherited), the attribute that is present lower in the hierarchy takes precedence.

In one embodiment, the central controller unit 110 is configured to manage each user and host present in the network such that the central controller unit 110 is configured to implement and dynamically maintain cross-network monitor port/flow sessions. Since the central controller unit 110 has knowledge of every user and every host in the network, it is capable of comprehensive network monitoring and not limited to static monitoring of specific types of network traffic. Indeed, in one embodiment, the central controller unit 110 is configured to use the handle by which the user or host is authenticated as the source and destination for monitor sessions in the network. The handle in one embodiment may include, but not limited to, a port, MAC address or a user name. In doing so, the user may configure the monitor session with high level intent. Since the central controller unit 110 is configured to maintain a monitor session between two handles, and given that the central controller unit is the sole entity for maintaining intra-network configuration (thus fully aware of the network topology at all times), the central controller unit 110 is capable of setting up and managing the necessary configurations on the network devices to maintain the monitor session without any administrative intervention as the network changes. Some examples of the network change discussed above includes, but not limited to user authentication in more than one host, user migration within the network, host migration within the network, and network topology change.

In this manner, the central controller unit 110 may be provided to the data network 100 to configure all network devices within an administrative domain. The network administrator, rather than configuring each network device in the network 100, configures the central controller unit 110 with high level intents for dynamic properties of the network configuration. In turn, the central controller unit 110 maybe configured to translate the high level intents into low level implementation details dynamically on an ongoing basis, and to maintain the configuration of each network device on the network 100.

Accordingly, all hosts or users joining or leaving the network 100 may be under the direct supervision of the central controller unit 110. This is valid regardless of the authentication mechanism used (such as the IEEE 802.1x). In the cases where the users or hosts do not authenticate with user name and/or passwords, they authenticate with location or MAC addresses. In this manner, the central controller unit 110 in one embodiment is configured to reliably track the users and hosts as they migrate within the network 100 being monitored and managed. Also, a user or host that is not tracked by the central controller unit 110 is not permitted onto the network.

In the manner discussed above, in accordance with one embodiment of the present invention, the dynamic network traffic monitoring and management by the central controller unit 110 provides cumbersome and ongoing configuration steps necessary to set up network wide traffic monitoring. Moreover, the network administrator need not be involved when the monitored entities or monitoring entities migrate within the network 100. Additionally, in one embodiment, by providing the central controller unit 110 to the network 100 to manage monitor sessions across a dynamic network, there is provided method and system for automatically, accurately and dynamically mapping users to devices without the user of an external tool, and further, for automatically, accurately and dynamically mapping hosts to locations without the use of an external tool such as, for example, a commercially available network sniffing tool.

Within the various embodiments of the present invention, the individual attributes may be still applied to arbitrary ports in the network. However, using the logical groups in the hierarchical structure in the network to specify port settings allow the port settings to remain grouped together with the comment attributes or network intent from which they were derived. In other words, the network administrator, rather than applying a particular group of settings to each port, generates or creates a hierarchy of logical groups in the network 100. Further, each node (logical group) in the network hierarchy is configured to map to a specific set of intents. By assigning the group to a port, the port is assigned the union (or sum) of the intents of the logical group and that of the logical groups above it in the network hierarchy.

As discussed above, in one embodiment, this approach may be implemented on multiple levels. At the lowest level, a hierarchy of physical groups may be used to apply physical network settings to the ports. In other words, physical settings such as those port settings that affect all network traffic or network devices connected through the port (such as, for example, data transmission speed, duplex function) may be applied to the ports. At a higher level, in one aspect, a hierarchy of logical groups may be used to apply logical network settings to users or network devices connected through the ports. More specifically, local settings such as port setting that may affect all network traffic, but may only affect individual users or hosts connected to the port.

In one embodiment, each port is assigned one physical group, but one or more logical groups may be assigned (or instantiated) on each port. Furthermore, in the case of logical groups, attributes may refer to other logical groups (such as, for example, ACLs, QoS), and application of such attributes, when applied, may result in modification of the low level settings of multiple ports. It can be seen that there does not necessarily have to be a one to one correspondence between the high level intent (network level configuration) in the logical groups and the low level settings after they are expanded on the port on which the logical group is instantiated.

In the manner described above, in accordance with the various embodiments of the present invention, the network port settings may be hierarchically grouped according to the high level intents (network level configuration) from which they were derived. By applying attributes of logical groups to the network port rather than applying the specific settings to the network port, the intent information associated with the logical groups remain with the network port. In this manner, dynamic and intelligent mapping of high level intent specification (i.e., the network level configuration) to low level port settings may extend beyond the port settings themselves.

As such, in one aspect, hierarchical groups in the network 100 may retain the relationships between the high level intent based configuration such as the network level configuration and the ports, which may be lost for example, when macros and/or templates are used as they are expanded. Moreover, network level configuration may be achieved with configuration through the hierarchical groups since the mapping of the high level intent specifications such as the network level configurations to low level port settings are not limited to settings on the port through which the intent or configuration was specified.

Indeed, a method of providing dynamic network configuration in accordance with one embodiment of the present invention includes monitoring a data network, detecting a change associated with a configuration of the data network, identifying one or more member groups affected by the detected change, and modifying the network configuration for the one or more member groups in the data network.

The one or more member groups may be arranged in a logical hierarchy in the data network, and further, where the logical hierarchy may include a plurality of logical groups, the one or more member groups corresponding to a respective one or more of the plurality of logical groups. Moreover, in one embodiment, each logical group in the hierarchy may be associated with one or more attributes.

In one aspect, the plurality of logical groups may be arranged in the hierarchy based on a network configuration setting.

In yet another embodiment, the step of modifying the network configuration of the one or more member groups may include comparing one or more attributes of a higher level member group in the logical hierarchy with a corresponding one or more attributes of the one or more member groups, and determining whether a conflict is present for each of the respective one or more attributes. Additionally, in still another aspect of the present invention, when it is determined that the conflict is present, the determining step may further include the steps of discarding the one or more attributes of the higher level member group, and applying the remaining one or more attributes of the higher level member group and the attributes of the one or more member groups to the one or more member groups.

The one or more member groups in one embodiment may be defined by one of a port setting, a MAC address, or a user authentication.

A method of providing dynamic network configuration in accordance with another embodiment of the present invention includes monitoring a data network, detecting a change associated with a configuration of the data network, identifying one or more member groups affected by the detected change, comparing one or more attributes of a higher level member group in the logical hierarchy with a corresponding one or more attributes of the one or more member groups, and determining whether a conflict is present for each of the respective one or more attributes, where the one or more member groups are arranged in a logical hierarchy including a plurality of logical groups, the one or more member groups corresponding to a respective one or more of the plurality of logical groups.

A system for monitoring and dynamically configuring a data network in yet another embodiment of the present invention includes a controller unit configured to monitor a data network and network configuration, where when a change associated with a configuration of the data network is detected, the controller unit is further configured to identify one or more member groups affected by the detected change, and to modify the network configuration for the one or more member groups in the data network.

Moreover, in yet another embodiment, the controller unit may be further configured to compare one or more attributes of a higher level member group in the logical hierarchy with a corresponding one or more attributes of the one or more member groups, and to determine whether a conflict is present for each of the respective one or more attributes, and further, when the controller unit determines that the conflict is present, the controller unit may be additionally configured to discard the one or more attributes of the higher level member group, and to apply the remaining one or more attributes of the higher level member group and the attributes of the one or more member groups to the one or more member groups.

The various processes described above including the processes performed by the central controller unit 110 in the software application execution environment in the data network 100 including the processes and routines described in conjunction with FIGS. 4 and 5, may be embodied as computer programs developed using an object oriented language that allows the modeling of complex systems with modular objects to create abstractions that are representative of real world, physical objects and their interrelationships. The software required to carry out the inventive process, which may be stored in the memory (not shown) of the central controller unit 110, may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of providing dynamic network configuration, comprising:
   monitoring a data network, by a controller operatively coupled to the data network;
   detecting a change associated with a configuration of the data network;
   identifying one or more member groups affected by the detected change, where each of the one or more member groups includes as members a plurality of ports of devices in the data network and each of the one or more member groups is associated with one or more attributes; and
   modifying, by the controller, the network configuration of a port, or a system that is coupled to the port, that is a member of the one or more member groups in the data network identified as being affected by the detected change, by applying the associated one or more attributes from the one or more member groups to the port or the system that is coupled to the port, wherein the one or more member groups are arranged in a logical hierarchy in the data network,
   the modifying includes:
      comparing one or more attributes associated with a higher level member group of the logical hierarchy with a corresponding one or more attributes associated with the one or more member groups of the logical hierarchy, and
      determining whether a conflict is present for each of the respective one or more attributes, and when it is determined that the conflict is present:
         discarding the one or more attributes of the higher level member group; and
         applying the remaining one or more attributes of the higher level member group and the attributes of the one or more member groups to the port, or the system that is coupled to the port, that is a member of the one or more member groups.

2. The method of claim 1 wherein the logical hierarchy includes a plurality of logical groups, the one or more member groups corresponding to a respective one or more of the plurality of logical groups.

3. The method of claim 2 wherein each logical group in the hierarchy is associated with one or more attributes.

4. The method of claim 2 wherein the plurality of logical groups are arranged in the hierarchy based on a network configuration setting.

5. The method of claim 1 wherein the one or more member groups are defined by one of a port setting, a MAC address, or a user authentication.

6. A method of providing dynamic network configuration, comprising the steps of:
   monitoring a data network, by a controller operatively coupled to the data network;
   detecting a change associated with a configuration of the data network;
   identifying one or more member groups affected by the detected change, where each of the one or more member groups includes as members a plurality of ports of devices in the data network, the one or more member groups arranged in a logical hierarchy, and each of the one or more member groups of the logical hierarchy is associated with one or more attributes;
   comparing, by the controller, one or more attributes of a higher level member group in the logical hierarchy with a corresponding one or more attributes of the one or more member groups; and
   determining whether a conflict is present for each of the respective one or more attributes, and when it is determined that the conflict is present:
      discarding the one or more attributes of the higher level member group; and
      applying the remaining one or more attributes of the higher level member group and the attributes of the one or more member groups to a port, or a system that is coupled to the port, that is a member of the one or more member groups.

7. The method of claim 6 wherein each logical group in the hierarchy is associated with one or more attributes.

8. The method of claim 6 wherein the plurality of logical groups is arranged in the hierarchy based on a network configuration setting.

9. The method of claim 6 wherein the one or more member groups are defined by one of a port setting, a MAC address, or a user authentication.

10. A system for monitoring and dynamically configuring a data network; comprising:
    a controller unit configured to
       monitor a data network and network configuration, wherein when a change associated with a configuration of the data network is detected, the controller unit is further configured to
       identify one or more member groups affected by the detected change, wherein each of the one or more member groups includes as members a plurality of ports of devices in the data network, and each of the one or more member groups is each associated with one or more attributes, and the one or more member groups are arranged in a logical hierarchy in the data network,
       modify the network configuration of a port, or a system that is coupled to the port, that is a member of the one or more member groups in the data network identified as being affected by the detected change, by applying the associated one or more attributes from the one or more member groups to the port or the system that is coupled to the port,
       compare one or more attributes associated with a higher level member group in the logical hierarchy with a corresponding one or more attributes of the one or more member groups, and
       determine whether a conflict is present for each of the respective one or more attributes, and when the controller unit determines that the conflict is present to
          discard the one or more attributes of the higher level member group, and
          apply the remaining one or more attributes of the higher level member group and the attributes of the one or more member groups to the port, or the system that is coupled to the port, that is a member of the one or more member groups.

11. The system of claim 10 wherein the logical hierarchy includes a plurality of logical groups, the one or more member groups corresponding to a respective one or more of the plurality of logical groups.

12. The system of claim 11 wherein each logical group in the hierarchy is associated with one or more attributes.

13. The system of claim 11 wherein the plurality of logical groups is arranged in the hierarchy based on a network configuration setting.

14. The system of claim 10 wherein the one or more member groups are defined by one of a port setting, a MAC address, or a user authentication.

15. A controller unit for providing network configuration, comprising:
- a processor unit configured to monitor a data network and network configuration, wherein when a change associated with a configuration of the data network is detected, the processor unit is further configured
  - to identify one or more member groups affected by the detected change, wherein each of the one or more member groups includes as members a plurality of ports of devices in the data network, each member group is associated with one or more attributes, and the member groups are arranged in a logical hierarchy,
  - to modify the network configuration of a port, or a system that is coupled to the port, that is a member of the one or more member groups in the data network identified as being affected by the detected change,
  - to compare one or more attributes associated with a higher level member group in the logical hierarchy with a corresponding one or more attributes of the one or more member groups, and
  - to determine whether a conflict is present for each of the respective one or more attributes, and when the processor unit determines that the conflict is present:
    - to discard the one or more attributes of the higher level member group, and
    - to apply the remaining one or more attributes of the higher level member group and the attributes of the one or more member groups to the port, or the system that is coupled to the port, that is a member of the one or more member groups.

* * * * *